(12) United States Patent
Sutcliffe (10) Patent No.: US 11,193,290 B2
(45) Date of Patent: Dec. 7, 2021

(54) RETROFIT ASSEMBLY FOR A CHLORINATOR

(71) Applicant: Champion Pool Products LLC, Shelton, CT (US)

(72) Inventor: Richard A. Sutcliffe, Stratford, CT (US)

(73) Assignee: CHAMPION POOL PRODUCTS LLC, Shelton, CT (US)

( * ) Notice: Subject to any disclaimer, the term of this patent is extended or adjusted under 35 U.S.C. 154(b) by 0 days.

(21) Appl. No.: 16/993,557

(22) Filed: Aug. 14, 2020

(65) Prior Publication Data

US 2021/0054641 A1   Feb. 25, 2021

Related U.S. Application Data

(60) Provisional application No. 62/888,706, filed on Aug. 19, 2019.

(51) Int. Cl.
*E04H 4/12* (2006.01)
*C02F 1/68* (2006.01)
*C02F 1/76* (2006.01)
*C02F 103/42* (2006.01)

(52) U.S. Cl.
CPC ........... *E04H 4/1281* (2013.01); *C02F 1/688* (2013.01); *C02F 1/76* (2013.01); *C02F 2103/42* (2013.01)

(58) Field of Classification Search
CPC .... E04H 4/1281; C02F 1/688; C02F 2103/42; C02F 1/76
USPC ................. 210/167.11, 198.1, 205, 754, 756
See application file for complete search history.

(56) References Cited

U.S. PATENT DOCUMENTS

| 4,732,689 A * | 3/1988 | Harvey | B01F 1/0027 210/167.11 |
| 5,089,127 A * | 2/1992 | Junker | B01F 1/0027 210/167.11 |
| 5,359,769 A * | 11/1994 | Silveri | C02F 1/46104 29/433 |
| 2004/0173514 A1* | 9/2004 | Cerny | C02F 1/688 210/206 |
| 2006/0249400 A1* | 11/2006 | Bremauer | C02F 1/4674 205/743 |

FOREIGN PATENT DOCUMENTS

WO   WO 2014/003841 A1 *  1/2014

* cited by examiner

*Primary Examiner* — Fred Prince
(74) *Attorney, Agent, or Firm* — Ware, Fressola, Maguire & Barber LLP (57) ABSTRACT

A retrofit assembly for a chlorinator has a cylindrical disk portion having a lower region for insertion into a cylindrical opening of a chlorinator cylinder, a groove for receipt of a first O-ring and a flange at the top to abut the cylindrical opening, and an upper cylindrical member attached to the lower region having exterior threads thereon, a central bore passing through the cylindrical disk portion for passage of chlorine tablets into the chlorinator cylinder, a cylindrical collar with threads for engagement with threads on the chlorinator cylinder, the collar configured to fit over the lower region of the cylindrical disk portion, and a cap having a cylindrical section with internal threads for engagement with the exterior threads of the upper cylindrical member to cover the central bore of the upper cylindrical member, wherein a recess formed in the cap has a bottom for receipt of a second O-ring.

11 Claims, 12 Drawing Sheets

RETROFIT ASSEMBLY FOR A CHLORINATOR

CROSS-REFERENCE TO RELATED APPLICATION

This application claims priority under 35 USC § 119 to U.S. Provisional Patent Application No. 62/888,706 filed on Aug. 19, 2019, the entire contents of which are hereby incorporated by reference.

TECHNICAL FIELD

The present invention relates to a retrofit assembly for a pool chlorinator.

BACKGROUND OF THE INVENTION

Pool chlorinators are known in the art. Conventional pool chlorinators typically have a cover assembly that includes a cover cap and a cover. The cover cap may have interior threads for securing the cover cap onto the top of a chlorinator cylinder. The cover is secured to the cover cap. The cover has a peripheral groove for receipt of an O-ring that forms a seal with the chlorinator cylinder when the cover assembly is threaded onto the chlorinator cylinder. The cover assembly must be removed periodically in order to add chlorine tablets to the chlorinator. The O-ring provides a seal between the cover and the chlorinator cylinder so as to prevent escape of harmful chlorine gases and the like.

It has been noticed that with such chlorinators, the removal of the cover assembly can become very problematic due to the deterioration of the O-ring as a result of the chlorine gas environment in which it is located within the chlorinator.

SUMMARY OF THE INVENTION

The present invention provides a solution to conventional chlorinator cover assemblies by replacing such a cover assembly with a retrofit assembly comprising a cylindrical disk portion having a lower region with an outer cylindrical perimeter with an annular groove for receipt of a first O-ring, the lower region dimensioned for insertion into a cylindrical opening of a chlorinator, a flange at the top of the lower region dimensioned to abut a periphery of said cylindrical opening of the chlorinator, and an upper cylindrical member attached to the lower region, the upper cylindrical member having exterior threads formed thereon, the lower region and the upper cylindrical member having a central bore therethrough for passage of chlorine tablets into said chlorinator, and a cylindrical collar having a cylindrical sidewall with interior threads formed thereon for threaded engagement with exterior threads on an upper end of said chlorinator, the collar having a central opening dimensioned so as to allow said collar to fit over the lower region of the cylindrical disk portion when said lower region is inserted into the cylindrical opening of said chlorinator, and a cap with a cylindrical section with internal threads formed in a recess of the cylindrical section, the internal threads dimensioned for engagement with the exterior threads of the upper cylindrical member to cover the central bore of said upper cylindrical member, wherein the recess is dimensioned for receipt of a second O-ring.

Furthermore, the retrofit assembly according to the present invention can have radially extending wings projecting radially outward on the cap so as to provide for mechanical advantage in turning the cap relative to the cylindrical disk portion of the retrofit assembly, thereby providing for easy manual removal of the cap for insertion of chlorine tablets.

Thus an embodiment of the present invention is a retrofit assembly for a chlorinator comprising a cylindrical disk portion having a lower region with an outer cylindrical perimeter with an annular groove for receipt of a first O-ring, the lower region dimensioned for insertion into a cylindrical opening of a chlorinator cylinder, a flange at the top of the lower region dimensioned to abut a periphery of said cylindrical opening of the chlorinator cylinder, and an upper cylindrical member attached to the lower region, the upper cylindrical member having exterior threads formed thereon, the lower region and the upper cylindrical member having a central bore therethrough for passage of chlorine tablets into said chlorinator cylinder, a cylindrical collar having a cylindrical sidewall with interior threads formed therein for threaded engagement with exterior threads on an upper end of said chlorinator cylinder, the collar having a central opening dimensioned so as to allow said collar to fit over the lower region of the cylindrical disk portion when said lower region is inserted into the cylindrical opening of said chlorinator cylinder, and a cap having a cylindrical section with internal threads formed in a recess of the cylindrical section, the internal threads dimensioned for engagement with the exterior threads of the upper cylindrical member to cover the central bore of said upper cylindrical member, wherein the recess has a bottom dimensioned for receipt of a second O-ring.

Another embodiment is the retrofit assembly as described above wherein the cap has two radially extending wings to assist in turning said cap.

Another embodiment is the retrofit assembly as described above wherein the first O-ring is fabricated from neoprene rubber.

Another embodiment is the retrofit assembly as described above wherein the second O-ring is fabricated from rubber.

Another embodiment is the retrofit assembly as described above wherein the second O-ring is fabricated from Viton® FKM rubber.

Another embodiment is the retrofit assembly as described above wherein the internal threads of the cap are dimensioned to capture said second O-ring when the second O-ring is positioned adjacent an interior surface of the cap adjacent a first end.

Another embodiment is the retrofit assembly as described above wherein the lower region of the cylindrical disk portion includes an alignment tab dimensioned to fit into a slot formed on a chlorinator.

Another embodiment is the retrofit assembly as described above wherein the cylindrical disk portion, cylindrical collar and cap are fabricated from plastic which is resistant to chlorine.

Another embodiment is the retrofit assembly as described above wherein the cylindrical collar has a depending notch dimensioned to interfit with a depressable tab of the chlorinator cylinder.

Another embodiment is the retrofit assembly as described above wherein the cylindrical collar has a depending notch dimensioned to interfit with a depressable tab of the chlorinator cylinder.

DETAILED DESCRIPTION

Figure 1:
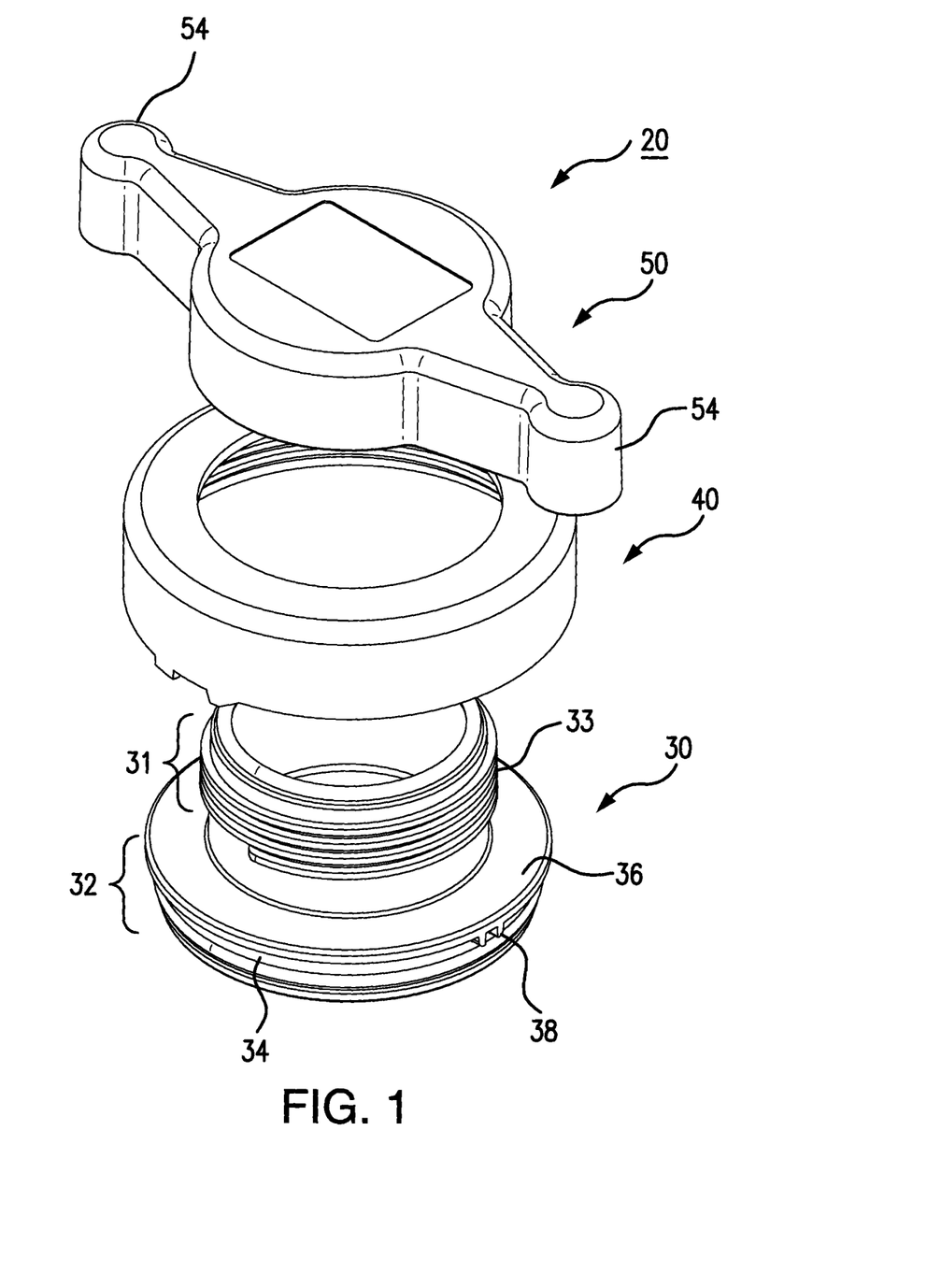
FIG. 1 is an exploded perspective view of the retrofit assembly for a chlorinator.
Figure 2:
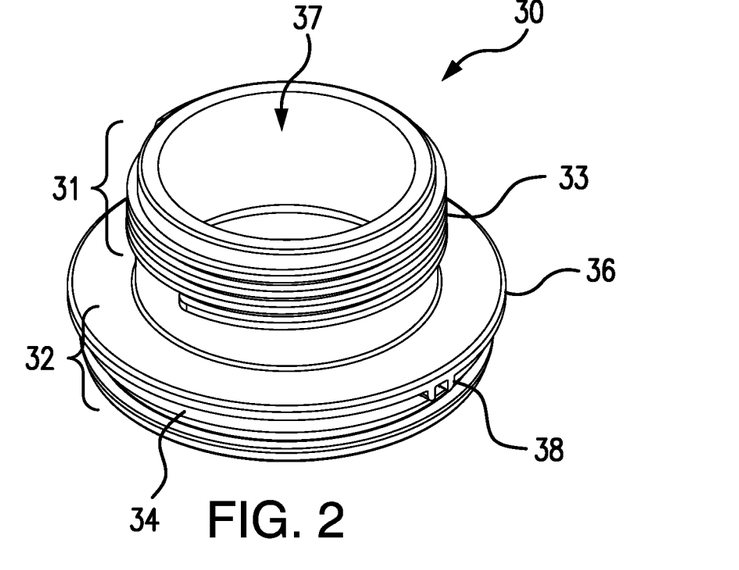
FIG. 2 is a perspective view of a cylinder disk portion of the retrofit assembly.
Figure 3:
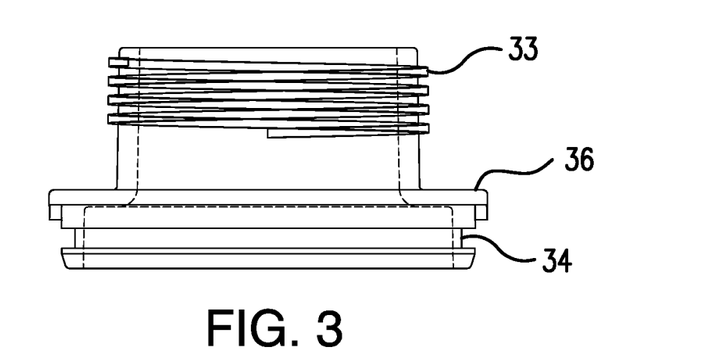
FIG. 3 is a side view of the cylindrical disk portion shown in FIG. 2.
Figure 3A:
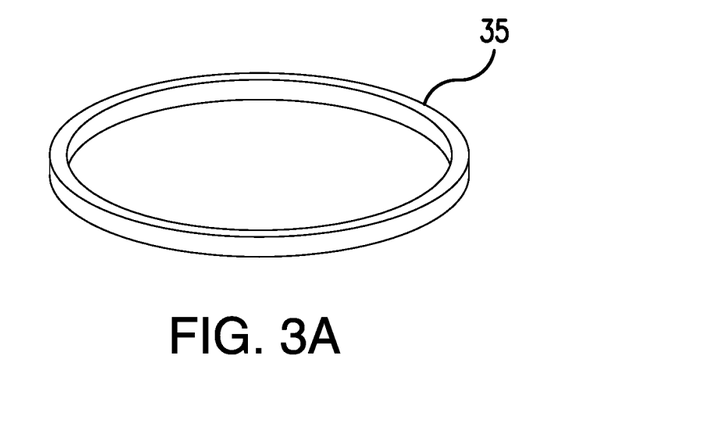
FIG. 3A is a perspective view of a first O-ring that fits into a groove of the cylindrical disk portion.
Figure 4:
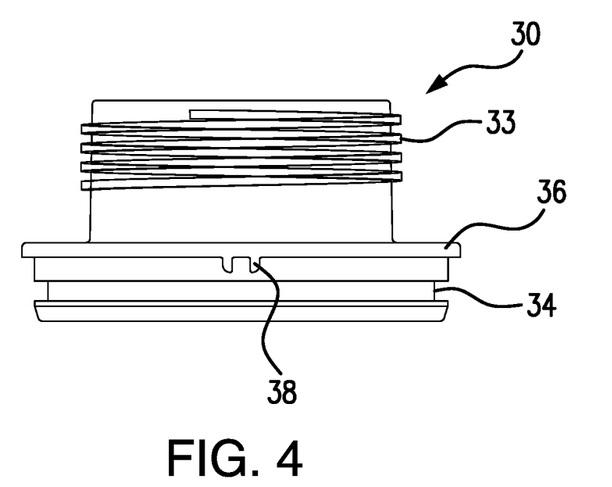
FIG. 4 is a side view of the cylindrical disk portion corresponding to FIG. 3 rotated 90° relative to FIG. 3.
Figure 5:
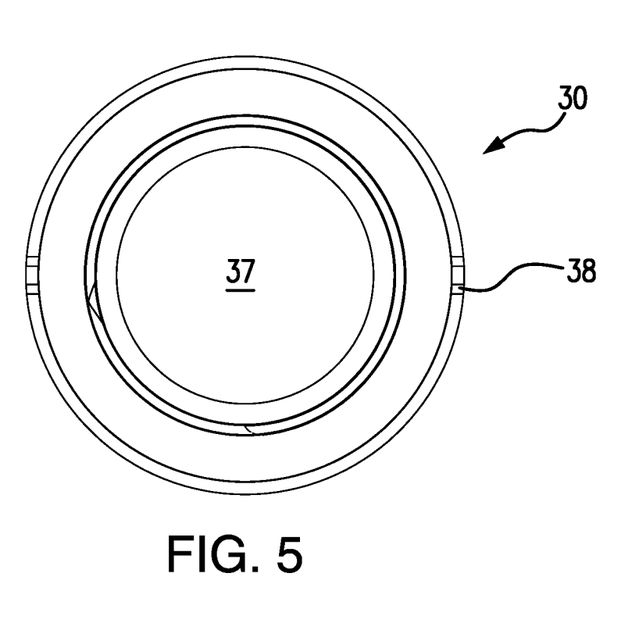
FIG. 5 is a top view of the cylindrical disk portion showing FIGS. 2-4.
Figure 6:
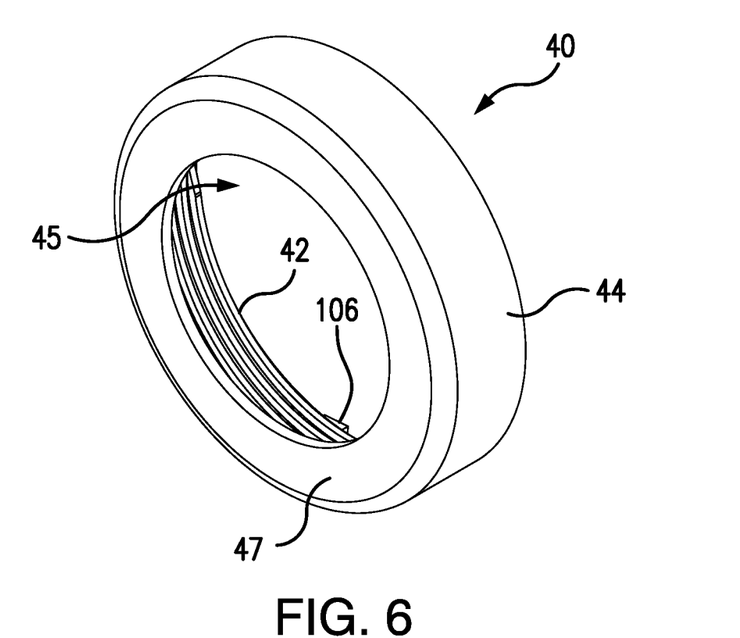
FIG. 6 is a perspective view of a cylindrical collar forming part of the retrofit assembly.
Figure 7:
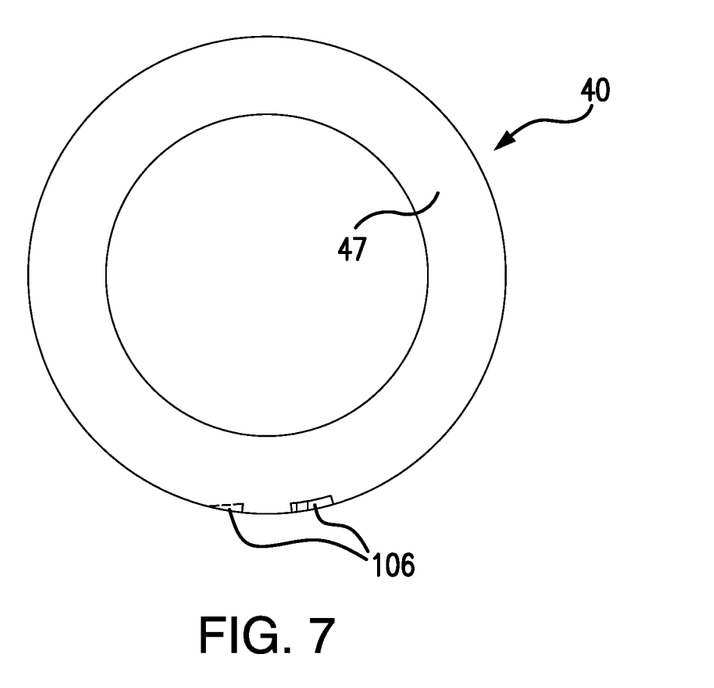
FIG. 7 is a top view of the cylindrical collar with a depending notch shown in phantom.
Figure 8:
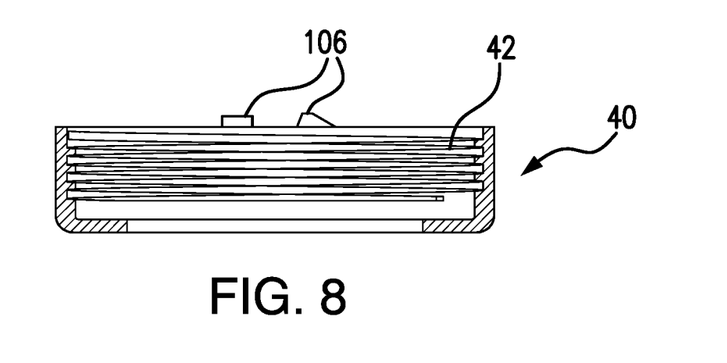
FIG. 8 is a cross-sectional view of the cylindrical collar showing the interior threads formed thereon and tabs to secure the collar to the chlorinator.
Figure 9:
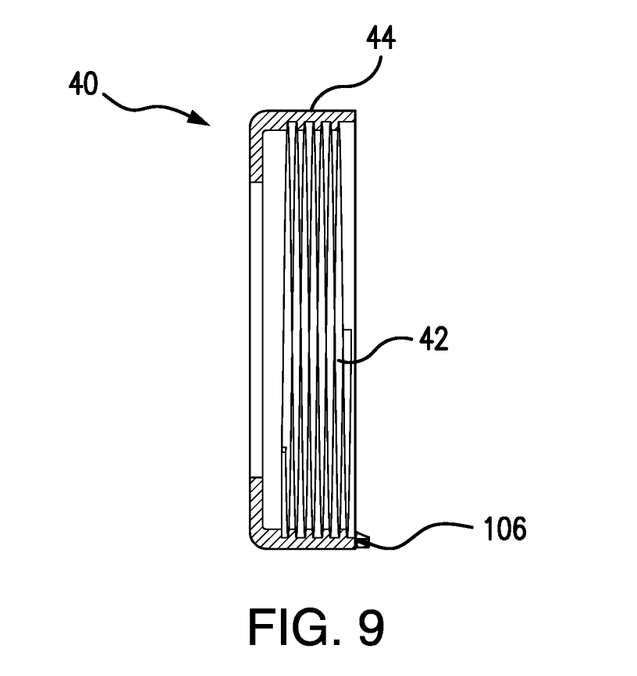
FIG. 9 is a side cross-sectional view of the cylindrical collar.
Figure 10:
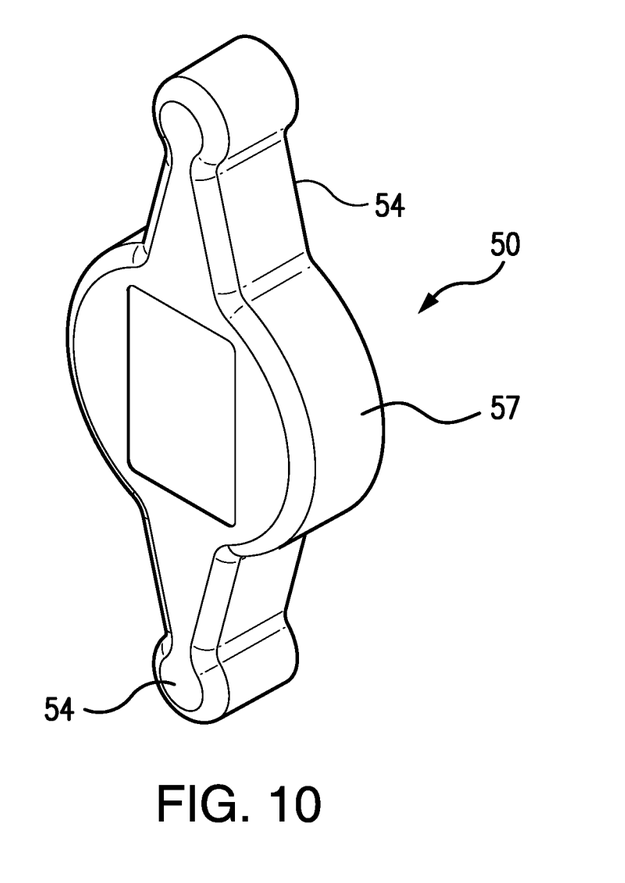
FIG. 10 is a perspective view of a cap forming part of the retrofit assembly.
Figure 14:
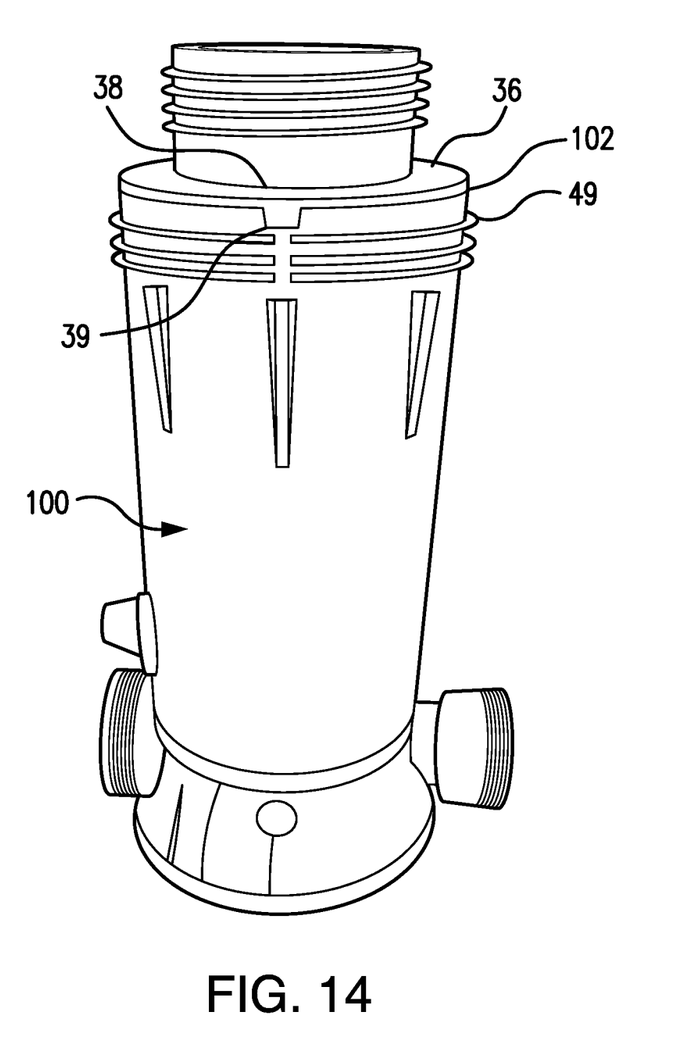
FIG. 14 is a top perspective view of a chlorinator cylinder (that is a chlorinator with its associated cover cap and cover removed) and further showing a cylindrical disk portion of the retrofit assembly inserted into a cylindrical opening at the top of the chlorinator cylinder.
Figure 14A:
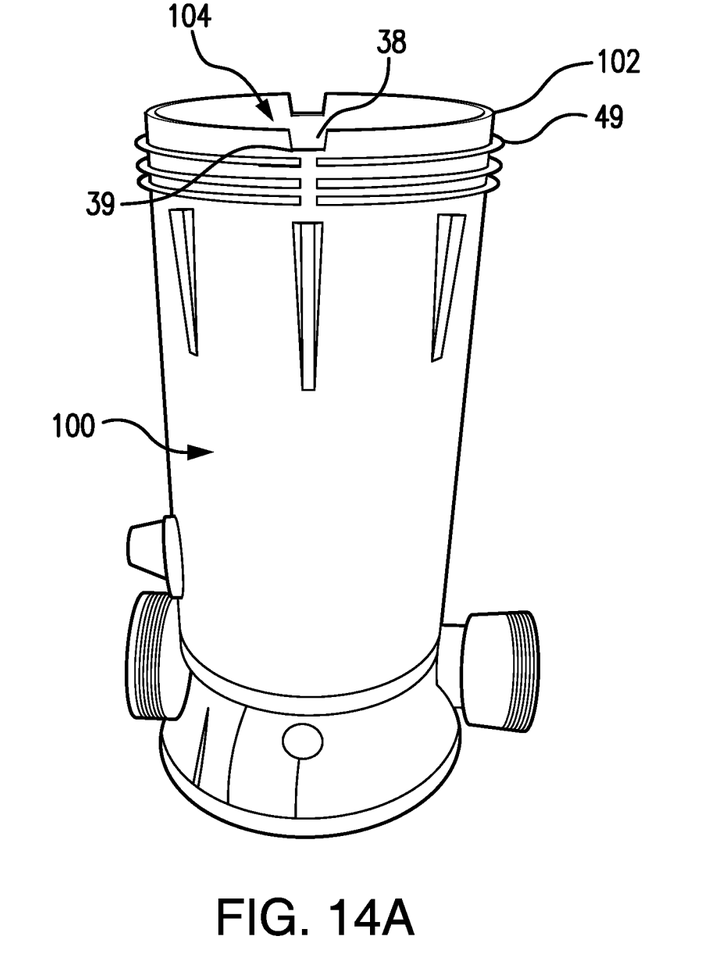
FIG. 14A is a perspective view of a chlorinator cylinder (with its original cover cap removed).

FIG. 1 shows a perspective view of the retrofit assembly 20 according to an embodiment of the present invention including a cylindrical disk portion 30, a cylindrical collar 40 and a cap 50. The cylindrical disk portion includes a lower region 32 having an annular groove 34 for receipt of a first O-ring 35 shown in FIG. 3A. The first O-ring is preferable made from 100% neoprene rubber. This first O-ring can be rectangular in cross-section so as to securely seat in groove 34 (see FIG. 3). Other cross-sectional configurations are possible such as a circular cross-section configuration. The cylindrical disk portion has a flange 36 at the top of the lower region which is dimensioned to abut a periphery 102 of a cylindrical opening 104 of a conventional chlorinator cylinder 100 as shown in FIGS. 14 and 14A. The lower region includes an alignment tab 38 dimensioned to fit into a slot 39 of a conventional chlorinator cylinder 100 as also shown in FIG. 14.

The cylindrical disk portion also has an upper cylindrical member 31 attached to the lower region, the upper cylindrical member having exterior threads 33 formed at its upper region. A central bore 37 passes through the lower region and upper cylindrical member of the cylindrical disk portion to allow passage of chlorine tablets into the chlorinator.

Details of the upper cylindrical member are shown in FIGS. 2-5.

Figure 15:
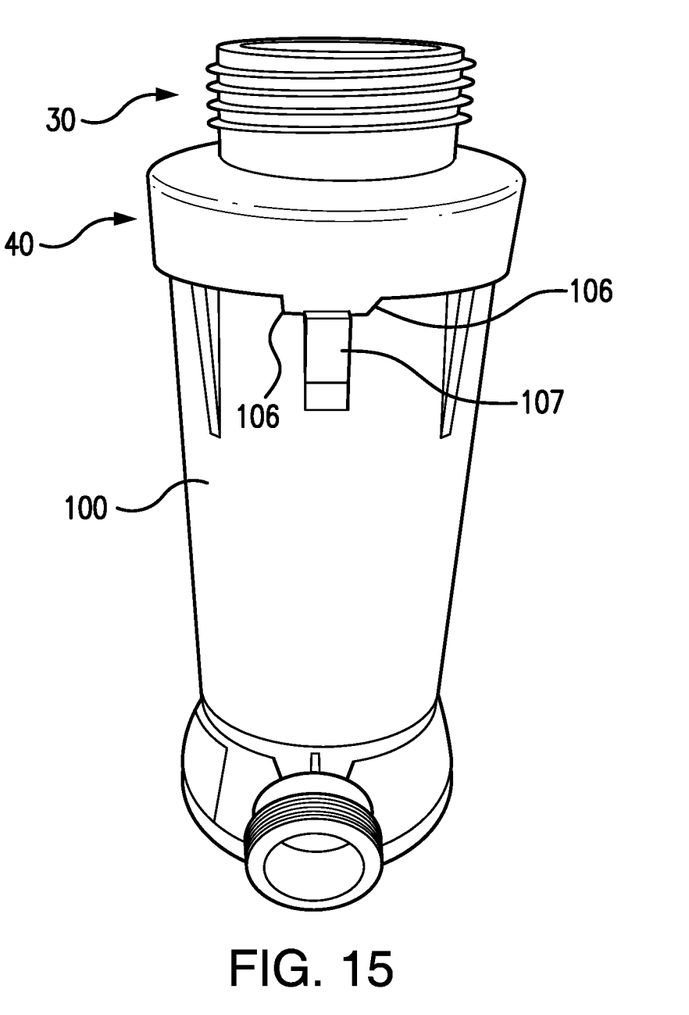
FIG. 15 is a perspective view of a cylindrical collar positioned over the cylindrical disk portion of the present invention onto the top of a chlorinator cylinder.

FIGS. 1 and 6-9 show details of the cylindrical collar 40 including interior threads 42, cylindrical sidewall 44 and central opening 45. The cylindrical collar also has a top cylindrical rim 47. When the cylindrical collar is positioned over the cylindrical disk portion 30, it has a configuration as shown in FIG. 15. The threads 42 of the cylindrical collar 40 are dimensioned for mating with the exterior threads 49 of the chlorinator cylinder as best seen in FIG. 14. The cylindrical collar may have a depending notch 106 dimensioned to snap fit into a depressable tab 107 of the chlorinator cylinder. When the notch is snapped onto the depressable tab 107, the cylindrical collar is prevented from rotating (unscrewing) from the exterior threads 49 of the chlorinator cylinder. As described below, this allows turning of cap 50 without unscrewing the cylindrical collar from the chlorinator cylinder 100. To unscrew the cylindrical collar from the chlorinator cylinder, the depressable tab 107 is pressed toward the chlorinator cylinder 100 with simultaneous rotation of the cylindrical collar.

Figure 11:
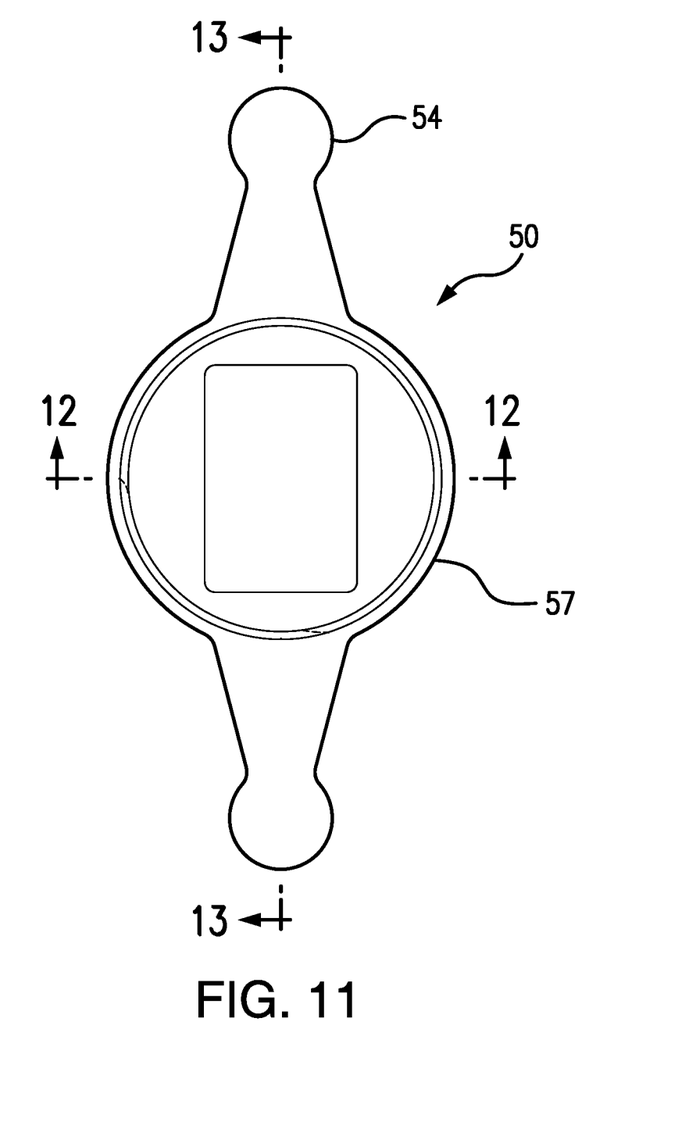
FIG. 11 is a top view of the cap.
Figure 11A:
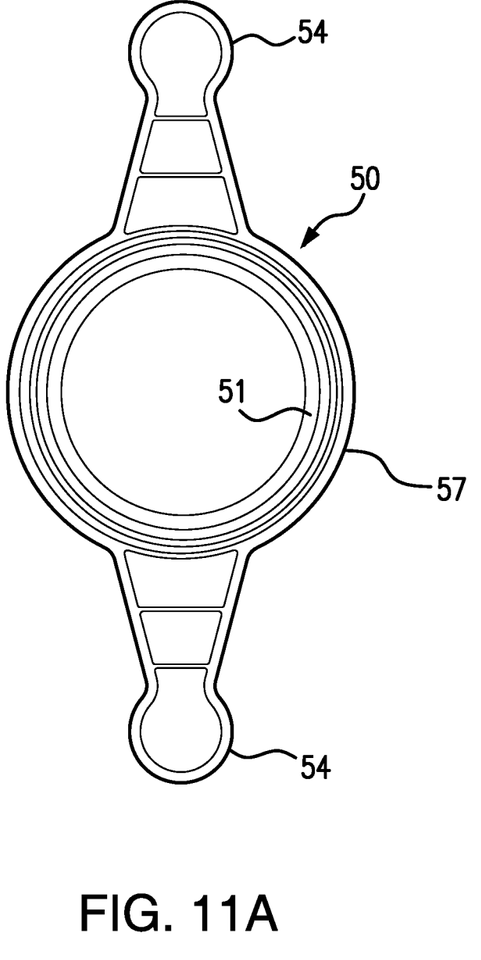
FIG. 11A is a bottom view of the cap showing a second O-ring inserted therein.
Figure 12:
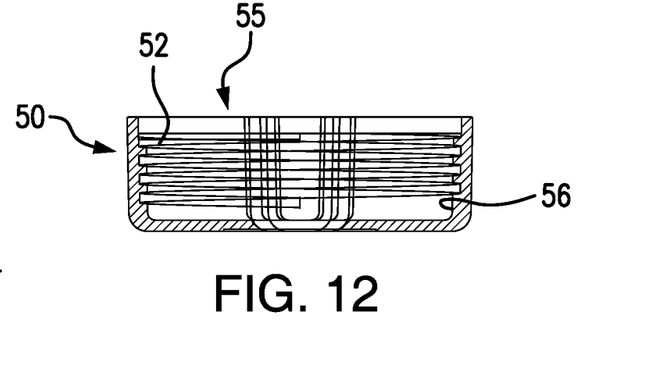
FIG. 12 is a cross-sectional view of the cap taken along line 12-12 of FIG. 11.
Figure 13:
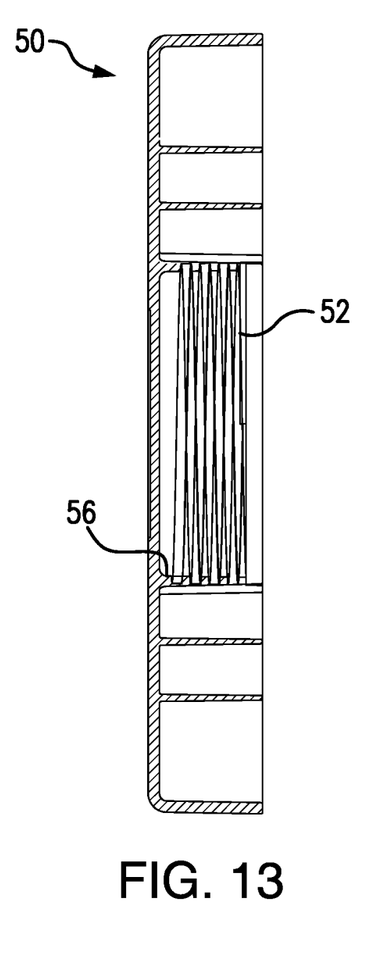
FIG. 13 is a cross-sectional view of the cap taken along line 13-13 of FIG. 11.
Figure 16:
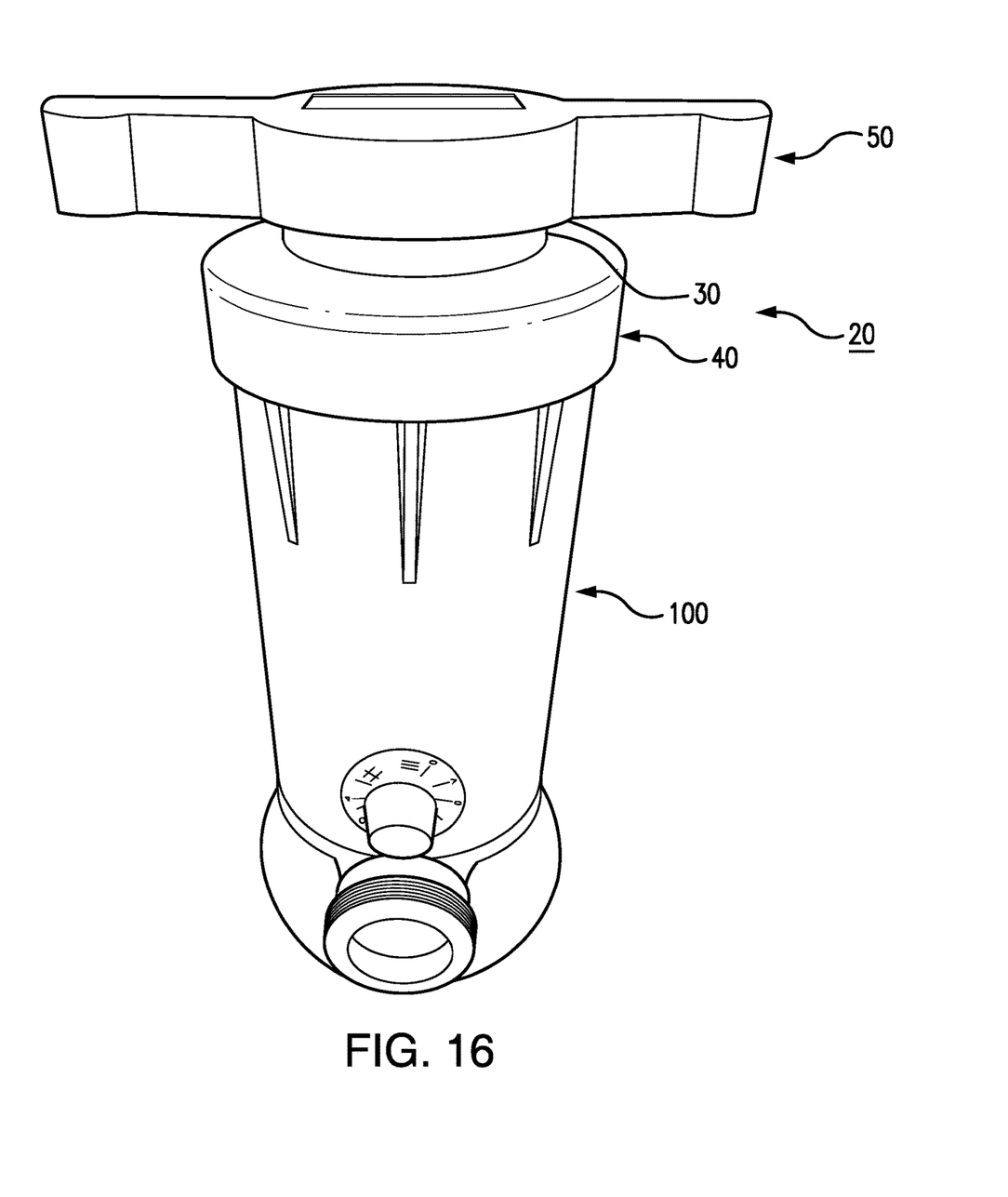
FIG. 16 is a perspective view of the retrofit assembly installed onto a chlorinator.

FIGS. 1, 10, 11, 11A, 12, 13 and 16 illustrate the cap 50 according to the present invention having a cylindrical section 57 with interior threads 52 which are dimensioned to mate with the exterior threads 33 of the cylindrical disk portion, thereby providing for tightening of the retrofit assembly to the chlorinator cylinder 100 as seen in FIG. 16. A second O-ring 51 is inserted into a bottom 56 of recess 55 (see FIG. 12) in the cap as seen in FIG. 11A. This second O-ring forms a seal to prevent chlorine, gas and other fluids from escaping out of the chlorinator cylinder. This second O-ring can be circular in cross-sectional configuration, although other cross-sectional configurations (such as rectangular or square) can be used. The second O-ring can be fabricated from rubber, such as fluoroelastomer (FKM) type rubber. A specific FKM type rubber that can be used is branded Viton® FKM type rubber. The cap can have radially extending wings 54 to provide mechanical advantage when tightening the cap to the cylindrical disk portion. This is seen in FIG. 16 showing the retrofit assembly 20 installed on the chlorinator 100.

Since the first O-ring 35 positioned around annual groove 34 of the cylindrical disk portion forms a seal relative to the chlorinator 100 when the cylindrical collar is tightened relative to the chlorinator as best seen in FIG. 15, this first O-ring 35 is not disturbed upon opening the cap for purposes of placing chlorine tablets into the chlorinator. This provides a distinct improvement relative to conventional chlorinator caps which have a cover cap and a cover, the cover threaded onto threads 49 and the cover cap having an O-ring inserted into a groove formed in the cover cap. This is seen, for example, in the Hayward brand automatic chlorine feeder model CL 200. Other Hayward brand automatic chlorine feeders use a cover and an O-ring inserted therein (see for example Hayward automatic chlorine feeder model CL 110). In such conventional chlorinators the O-ring being in a chlorine environment typically becomes very difficult to dislodge when a conventional chlorinator cap has to be removed. This in turn makes it extremely difficult to remove the cover cap or cover (depending on the model) for purposes of adding chlorine tablets to the chlorinator.

In contrast to such conventional chlorinators, cap 50 of the present invention with associated radially extending wings 54, allows for easy turning of the cap. Thus, the second O-ring 51 in the recess of the cap does not present a significant impediment to removal of the cap, even if this O-ring requires replacement due to the chlorine gas environment. Furthermore, because the cylindrical collar is prevented from rotating relative to chlorinator cylinder 100 due to depending notch 106 interfitting with depressable tab 107 of the chlorinator cylinder, rotation of the cylindrical collar is not a concern when rotating cap 50.

Therefore, the first O-ring 35 in contact with the chlorinator is not disturbed by removal of the cap when chlorine tablets are required by the chlorinator.

The cylindrical disk portion 30, cylindrical collar 40 and cap 50 can be fabricated by injection molding. Chlorine resistant plastic must be used for these parts.

Therefore, the present invention provides a retrofit assembly for a chlorinator which enables easy addition of chlorine tablets to the chlorinator cylinder without disturbing the first O-ring forming part of the seal between the chlorinator and the retrofit assembly.

What is claimed is:

1. A retrofit assembly for a chlorinator comprising:
    a cylindrical disk portion having
        a lower region with an outer cylindrical perimeter with an annular groove for receipt of a first O-ring, the lower region dimensioned for insertion into a cylindrical opening of a chlorinator cylinder, a flange at the top of the lower region dimensioned to abut a periphery of said cylindrical opening of the chlorinator cylinder, and
        an upper cylindrical member attached to the lower region, the upper cylindrical member having exterior threads formed thereon, the lower region and the upper cylindrical member having a central bore therethrough for passage of chlorine tablets into said chlorinator cylinder;
    a cylindrical collar having a cylindrical sidewall with interior threads formed therein for threaded engagement with exterior threads on an upper end of said chlorinator cylinder, the collar having a central opening dimensioned so as to allow said collar to fit over the lower region of the cylindrical disk portion when said lower region is inserted into the cylindrical opening of said chlorinator cylinder; and
    a cap having a cylindrical section with internal threads formed in a recess of the cylindrical section, the internal threads dimensioned for engagement with the exterior threads of the upper cylindrical member to cover the central bore of said upper cylindrical member, wherein the recess has a bottom dimensioned for receipt of a second O-ring.

2. The retrofit assembly according to claim 1, wherein the cap has at least two radially extending wings to assist in turning said cap.

3. The retrofit assembly according to claim 1, wherein the first O-ring is fabricated from neoprene rubber.

4. The retrofit assembly according to claim 3, wherein the second O-ring is fabricated from rubber.

5. The retrofit assembly according to claim 1, wherein the second O-ring is fabricated from rubber.

6. The retrofit assembly according to claim 5, wherein the second O-ring is fabricated from Viton® FKM rubber.

7. The retrofit assembly according to claim 1, wherein the internal threads of the cap are dimensioned to capture said second O-ring when the second O-ring is positioned adjacent an interior surface of the cap adjacent a first end.

8. The retrofit assembly according to claim 1 wherein, the lower region of the cylindrical disk portion includes an alignment tab dimensioned to fit into a slot formed on a chlorinator.

9. The retrofit assembly according to claim 1, wherein the cylindrical disk portion, cylindrical collar and cap are fabricated from plastic resistant to chlorine.

10. The retrofit assembly according to claim 9, wherein the cylindrical collar has a depending notch dimensioned to interfit with a depressable tab of the chlorinator cylinder.

11. The retrofit assembly according to claim 2, wherein the cylindrical collar has a depending notch dimensioned to interfit with a depressable tab of the chlorinator cylinder.

\* \* \* \* \*